Patented July 29, 1941

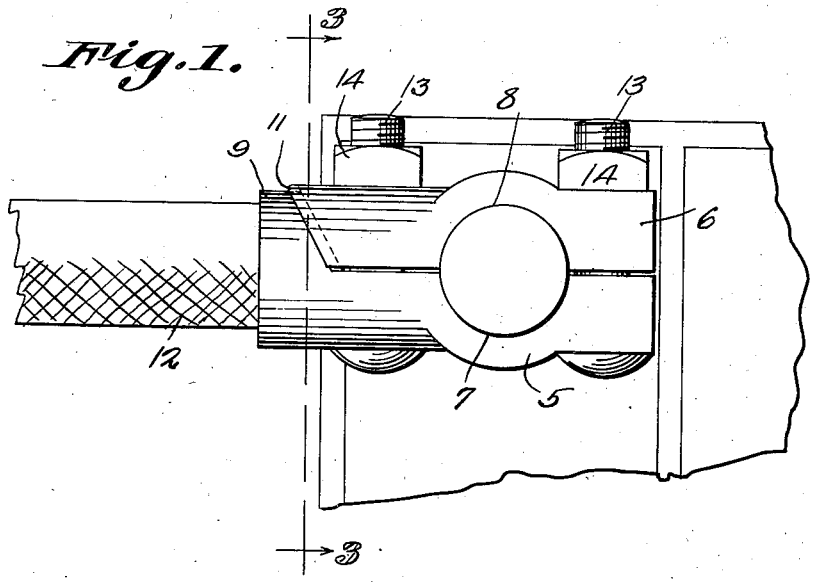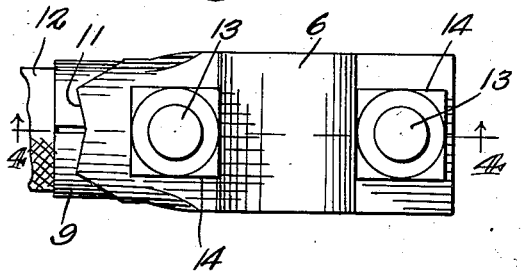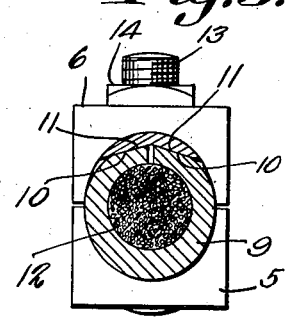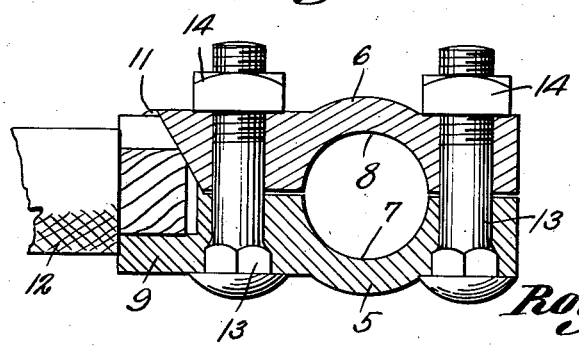
Roy Randall
INVENTOR.

2,250,841

UNITED STATES PATENT OFFICE 2,250,841

BATTERY POST CONNECTION

Roy Randall, Aspen, Colo.

Application June 18, 1940, Serial No. 341,209

2 Claims. (Cl. 173—259)

This invention relates to battery terminals, the primary object of the invention being to provide a terminal of this character embodying separable sections adapted to be bolted to a battery post, in such a way that the terminal may be readily and easily removed, eliminating the danger of damaging the terminal or battery post to which the terminal is secured.

An important object of the invention is to provide a terminal embodying seperable sections, the terminal including a split sleeve adapted to be clamped around the electric cable used in connection with the terminal, the sections of the terminal being so constructed that they will cause the sleeve to be moved into clamping relation with the electric cable, when the sections of the terminal are bolted together in securing the terminal on a battery post.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a plan view illustrating a battery terminal constructed in accordance with the invention, and showing the battery terminal as secured to a battery post.

Figure 2 is a plan view of the battery terminal.

Figure 3 is a sectional view taken on line 3—3 of Figure 1.

Figure 4 is a sectional view taken on line 4—4 of Figure 2.

Referring to the drawing in detail, the battery terminal comprises a main section 5 and a clamping section 6, the main section being formed with a curved battery post engaging surface 7 that cooperates with the curved battery post-engaging surface 8 of the clamping section 6.

At one end of the main section 5, is a split sleeve indicated at 9, the inner edge of the split sleeve being beveled as at 10 providing cam surfaces to be engaged by the cam surface 11 at one end of the clamping section 6, so that when the clamping section is bolted in position around a battery post, the cam surface of the clamping section will move over the beveled surfaces of the split sleeve, moving the split sleeve in such a way as to clamp the electric cable which is positioned therein. In the present showing, an electric cable is indicated by the reference character 12. It will of course be understood that these battery terminals are constructed preferably of lead or other suitable material, and will move readily into clamping relation with the cable.

Registering openings are formed in the main section 5 and clamping section 6, for the reception of the bolts 13, there being provided nuts 14 on the threaded ends of the bolts, for drawing the clamping section and main section together in close engagement with the battery post with which the terminal is used.

From the foregoing it will be seen that due to the construction shown and described, the clamping section and main section may be readily separated, when the nuts 14 have been released, by merely placing a tool between the adjacent edges of the sections and prying them apart. When the sections have been separated, it will be seen that by placing a tool under the split sleeve, the sleeve may be readily opened to release the electric cable.

When it is desired to reposition the cable, it is only necessary to force one end of the cable into the sleeve and position the terminal over the battery post with which the cable is to be used.

When the bolts have been positioned and the nuts rotated to draw the sections together, it will be obvious that the split sleeve will be contracted and will firmly grip the electric cable 12.

What is claimed is:

1. A battery terminal connector comprising a main section and a clamping section, said sections having curved battery post-engaging surfaces, a split sleeve formed at one end of the main section and adapted to receive an electric cable, a portion of the split sleeve being cutaway defining an inclined surface, said clamping section being also curved and adapted to fit over the split sleeve, one end of the clamping section being inclined and extended over the inclined surface of the split sleeve in contact therewith, forcing the split sleeve into clamping relation with the electric cable positioned on the split sleeve, when the sections are drawn together, and bolts extending through the sections and adapted to draw the sections together around the battery post.

2. A battery terminal connector comprising a main section and a clamping section, said sections having curved battery post-engaging surfaces, a split sleeve formed at one end of the main section, said clamping section being curved and fitted over the split sleeve of the main section and in engagement therewith, the engaging surfaces of the sections being inclined, bolts extending through the sections and adapted to draw the sections together around the battery post, said curved clamping sections adapted to press the split sleeve around the cable positioned therein when the sections are drawn together.

ROY RANDALL.